US011094246B2

(12) United States Patent
Bae et al.

(10) Patent No.: US 11,094,246 B2
(45) **Date of Patent: *Aug. 17, 2021**

(54) OPERATING MODULE FOR DISPLAY AND OPERATING METHOD, AND ELECTRONIC DEVICE SUPPORTING THE SAME

(71) Applicant: Samsung Electronics Co., Ltd., Gyeonggi-do (KR)

(72) Inventors: Jong Kon Bae, Seoul (KR); Dong Hui Kim, Gyeonggi-do (KR); Dong Kyoon Han, Gyeonggi-do (KR); Tae Sung Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,543

(22) Filed: Apr. 6, 2020

(65) Prior Publication Data

US 2020/0234631 A1 Jul. 23, 2020

Related U.S. Application Data

(63) Continuation of application No. 16/258,757, filed on Jan. 28, 2019, now Pat. No. 10,614,748, which is a (Continued)

(30) Foreign Application Priority Data

Aug. 26, 2015 (KR) ........................ 10-2015-0120070

(51) Int. Cl.
*G06F 3/038* (2013.01)
*G09G 5/00* (2006.01)
(Continued)

(52) U.S. Cl.
CPC ......... *G09G 3/2096* (2013.01); *G09G 3/3275* (2013.01); *G09G 3/3666* (2013.01);
(Continued)

(58) Field of Classification Search
CPC combination set(s) only.
See application file for complete search history.

(56) References Cited

U.S. PATENT DOCUMENTS 7,230,471 B2 6/2007 Choi et al.
8,144,100 B2 3/2012 Woo et al.
(Continued)

FOREIGN PATENT DOCUMENTS

KR 10-2005-0061279 A 6/2005
KR 10-2005-0106578 A 11/2005

*Primary Examiner* — Insa Sadio
(74) *Attorney, Agent, or Firm* — Cha & Reiter, LLC

(57) ABSTRACT

An electronic device is provided. The electronic device may include a display driver module configured to, in response to receiving display data, divide the display data into a plurality of segments corresponding to a plurality of display regions, compare the display data in the plurality of segments to determine whether the display data in at least one segment is substantially same as the display data in another segment, and based on the comparison outcome, selectively amplify a first display signal generated from the display data in the at least one segment or a second display signal generated from the display data in the another segment.

14 Claims, 13 Drawing Sheets

Related U.S. Application Data continuation of application No. 15/244,459, filed on Aug. 23, 2016, now Pat. No. 10,192,476.

(51) Int. Cl.

| | |
|---|---|
| ***G09G 3/20*** | (2006.01) |
| ***G09G 3/3275*** | (2016.01) |
| ***G09G 3/36*** | (2006.01) |

(52) U.S. Cl.

CPC ... *G09G 3/3688* (2013.01); *G09G 2310/0286* (2013.01); *G09G 2310/0291* (2013.01); *G09G 2320/103* (2013.01); *G09G 2330/021* (2013.01)

(56) References Cited

U.S. PATENT DOCUMENTS

| | | | |
|---|---|---|---|
| 8,537,092 | B2 | 9/2013 | Woo et al. |
| 8,970,465 | B2 | 3/2015 | Woo et al. |
| 2005/0134546 | A1 | 6/2005 | Woo et al. |
| 2005/0248388 | A1 | 11/2005 | Choi et al. |
| 2012/0176391 | A1 | 7/2012 | Woo et al. |
| 2014/0002510 | A1 | 1/2014 | Woo et al. |
| 2014/0253532 | A1 | 9/2014 | Woo et al. |
| 2015/0091849 | A1* | 4/2015 | Ludden .................. G06F 3/044 345/174 |

* cited by examiner

OPERATING MODULE FOR DISPLAY AND OPERATING METHOD, AND ELECTRONIC DEVICE SUPPORTING THE SAME

CROSS REFERENCE TO RELATED APPLICATIONS

This application is a Continuation of U.S. patent application Ser. No. 16/258,757 filed on Jan. 28, 2019 which is a Continuation of U.S. patent application Ser. No. 15/244,459 filed on Aug. 23, 2016 and assigned U.S. Pat. No. 10,192,476 issued on Jan. 29, 2019 which claims the benefit under 35 U.S.C. § 119(a) of a Korean patent application filed on Aug. 26, 2015 in the Korean Intellectual Property Office and assigned Serial number 10-2015-0120070, the entire disclosure of which is hereby incorporated by reference.

TECHNICAL FIELD

The present disclosure relates to methods for driving a display.

BACKGROUND

Recently, electronic devices such as smartphones have been developed that may provide a rich user experience and various functions to users. Such electronic devices may include a display for displaying information.

The power consumption of a display may occupy a large portion of the total power consumption of an electronic device. Therefore, it is desired for such electronic devices to support a low-power mode for driving the display in order to reduce power and/or battery consumption.

SUMMARY

Accordingly, an aspect of the present disclosure is to provide a display driver module and a display driving method for enabling low-power driving and an electronic device supporting the same.

In accordance with an aspect of the present disclosure, an electronic device is provided. The electronic device may include a display driver module configured, in response to receiving display data, divide the display data into a plurality of segments corresponding to a plurality of display regions, compare the display data in the plurality of segments to determine whether the display data in at least one segment is substantially same as the display data in another segment, and based on the comparison outcome, selectively amplify a first display signal generated from the display data in the at least one segment or a second display signal generated from the display data in the another segment.

In accordance with another aspect of the present disclosure, a method for operating an electronic device is provided. The method may include, in response to receiving display data, dividing the display data into a plurality of segments corresponding to a plurality of display regions, comparing the display data in the plurality of segments to determine whether the display data in at least one segment is substantially same as the display data in another segment, and based on the comparison outcome, selectively amplifying a first display signal generated from the display data in the at least one segment or a second display signal generated from the display data in the another segment.

DETAILED DESCRIPTION

Figure 1:
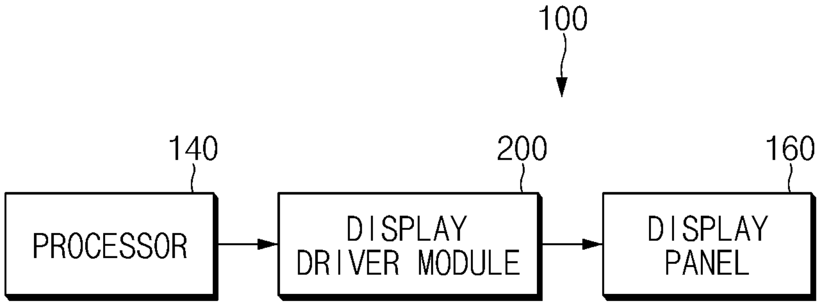
FIG. 1 is a schematic diagram illustrating an electronic device including a display driving module according to an embodiment of the present disclosure.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™, electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a schematic diagram illustrating an electronic device including a display driver module (or a display driver IC or processor for operating display) according to an embodiment of the present disclosure.

Referring to FIG. 1, an electronic device 100 may include a processor 140 (e.g., an application processor (AP)), a display driver module (e.g., a display driver module or "IC," "DDI") 200, and a display panel 160. The electronic device 100 may be implemented as a portable electronic device. The portable electronic device may be implemented as, for example, a mobile phone, a smartphone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile Internet device (MID), an Internet tablet, an e-book, or the like. According to one embodiments of the present disclosure, the display driver module 200 and the display panel 160 other than the processor 140 may be implemented as a separate display device or a separate display module).

The processor 140 may control overall operation of the electronic device 100. According to an embodiment of the present disclosure, the processor 140 may be implemented with an integrated circuit, a system on chip, or a mobile AP. The processor 140 may transfer, to the display driver module 200, display data (e.g., image data, video data, or still image data) to be displayed. According to an embodiment of the present disclosure, the display data may be divided by a line data unit corresponding to a horizontal line of the display panel 160. The processor may be any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

The display driver module 200 may convert the display data received from the processor 140 into a format transmittable to the display panel 160, and may transfer the display data to the display panel 160. According to an embodiment of the present disclosure, the display driver module 200 may determine divide the display data into segments and determined whether data in the various segments have the same or substantially the same value. If display data in two segments are the same or substantially the same, for example, the display driver module 200 may amplify the signal corresponding to the display data of only one of the segments using the amplifier allocated to a corresponding source line (a source line to which the display data are supplied) corresponding to the one of the segments. Accordingly, since the display driver module 200 operates only a portion of the amplifiers (or one amplifier) in order to amplify a signal supplied to each source line, power for operating the amplifiers may be reduced.

In relation to the above-mentioned operation, the electronic device 100 may group amplifiers which supply signals to segments or channels (e.g., segments for sub pixels) included in the display panel into groups. Alternatively, the electronic device 100 may divide all the segments or channels into groups of a certain number of channels, and may group amplifiers which amplify the signals of the grouped channels. The number of channels of a channel group or the number of amplifiers of an amplifier group may be changed depending on design choice. For example, the number of amplifiers (or channels) in a group may be changed depending on the performance of the amplifier or a setting of the display screen.

According to one embodiment of the present disclosure, the electronic device 100 may group pixels (e.g., a group of sub-pixels, such as RGB or RGGB which are grouped pixels for generating a white color) included in the display panel 160. Alternatively, the electronic device 100 may group amplifiers which amplify the signals of the grouped pixels, so as to operate the amplifiers. The number of pixels to be grouped in a group may be changed according to the performance of the amplifier or a characteristic of a screen to be output. The electronic device 100 may include individual control lines for operating grouped amplifiers.

The display panel 160 may display the display data using the display driver module 200. According to one or more embodiments of the present disclosure, the display 160 may be implemented with a thin-film transistor liquid crystal display (TFT-LCD) panel, a light emitting diode (LED) panel, an organic LED (OLED) panel, an active matrix OLED (AMOLED) panel, a flexible panel, or the like.

Figure 2:
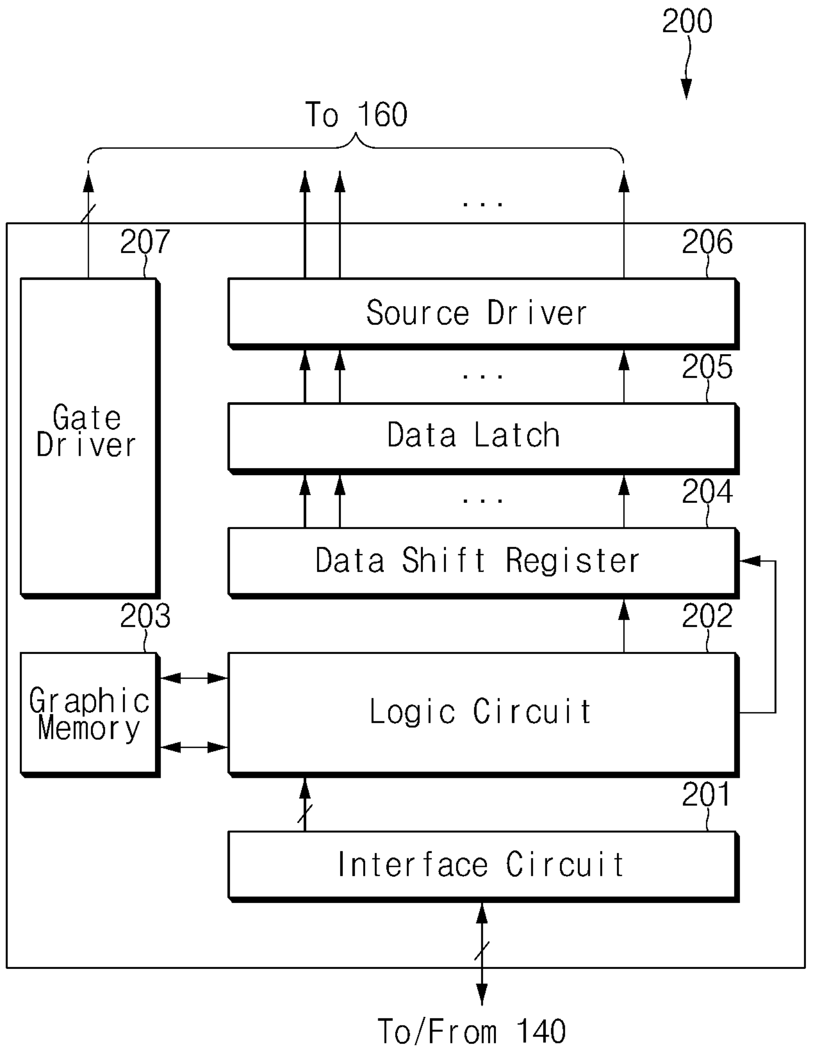
FIG. 2 is a diagram illustrating a display driver module according to an embodiment of the present disclosure.

FIG. 2 is a diagram illustrating a display driver module according to an embodiment of the present disclosure.

Referring to FIGS. 1 and 2, the display driver module 200 may include an interface circuit 201, a logic circuit block 202, a graphic memory 203, a data latch 205, a source driver 206, and a gate driver 207. At least one of the controllers or the units described below may be implemented as at least one hardware processor. Alternatively, at least a portion of the controllers or at least a portion of the units may be implemented as at least one hardware processor.

The logic circuit block 202 may include a graphic memory write controller, a timing controller, a data comparison circuit, a graphic memory read controller, an image processing unit, a source shift register controller, or a data shift register.

The interface circuit 201 may interface signals or data exchanged between the processor 140 and the display driver module 200. The interface circuit 201 may transfer line or display data received from the processor 140 to the graphic memory write controller of the logic circuit block 202 by interfacing the line data. According to an embodiment of the present disclosure, the interface circuit 201 may be an interface circuit suitable for a serial interface such as Mobile Industry Processor Interface (MIPI™), Mobile Display Digital Interface (MDDI), DisplayPort, embedded DisplayPort (eDP), etc.

The graphic memory write controller of the logic circuit block 202 may control an operation of receiving line or display data transferred from the interface circuit 201 and writing the line data in the graphic memory 203. The graphic memory write controller may transfer received line data to the data comparison circuit.

The graphic memory 203 may store line data input through the graphic memory write controller, in response to control by the graphic memory write controller. The graphic memory 203 may operate as a buffer memory in the display driver module 200. According to an embodiment of the present disclosure, the graphic memory 203 may be implemented with a graphic random access memory (GRAM).

The timing controller may supply a synchronizing signal and/or a clock signal to each element of the display driver module 200 (e.g., the data comparison circuit or the graphic memory read controller). Furthermore, the timing controller may transfer, to the graphic memory read controller, a read command, for example a read command called RCMD, for controlling a read operation of the graphic memory 203.

The data comparison circuit may analyze a pattern of line data received from the graphic memory write controller, and may generate comparison value information according to a result of the analysis. The data comparison circuit may transfer the comparison value information to at least one of the graphic memory read controller, the image processing unit, the source shift register controller, or a data shift register 204. The operations of the data comparison circuit are explained further in detail below.

The graphic memory read controller may perform a read operation on the line data stored in the graphic memory 203. According to an embodiment of the present disclosure, the graphic memory read controller may perform a read operation on a portion or all of the line data stored in the graphic memory 203 based on the read command RCMD and the comparison value information for the line data. The graphic memory read controller may transfer, to the image processing unit, a portion or all of line data read from the graphic memory 203. Although the graphic memory write controller and the graphic memory read controller are described as individual elements for convenience, the graphic memory write controller and the graphic memory read controller may be implemented as one graphic memory controller in software and/or hardware.

The image processing unit may process a portion or all of line data received from the graphic memory read controller so as to improve image quality. The image processing unit may disable a part of the image processing unit based on the comparison value information received from the data comparison circuit.

The source shift register controller may control operation of the data shift register 204. The source shift register controller may control a data shifting operation of the data shift register based on the comparison value information received from the data comparison circuit. For example, the source shift register controller may transfer the display data and the comparison value information to the data shift register 204.

The data shift register 204 may shift line data received from the source shift register controller, in response to control by the source shift register controller. The data shift register 204 may sequentially transfer shifted line data to the data latch 205. The data shift register 204 may also perform different operations according to the comparison value information received from the data comparison circuit. The operations of the source shift register controller and the data shift register 204 are explained further in detail below.

The data latch 205 may store the line data sequentially received from the data shift register 204. The data latch 205 may then transfer the stored line data to the source driver 206 in units of horizontal lines of the display panel 160.

The source driver 206 may transfer the line data received from the data latch 205 to the display panel 160. According to an embodiment of the present disclosure, the source driver 206 may include an amplifier connected for each segment or channel of the display data (e.g., a segment or channel for each sub-pixel). The amplifiers included in the source driver 206 may be grouped so that each amplifier is associated with a segment or a sub-group of segments. For example, the amplifiers included in the source driver 206 may be grouped so that an amplifier is assigned to a certain number of segments for a color channel (e.g., a red channel, a green channel, a blue channel, etc.). Alternatively, the amplifiers included in the source driver 206 may be grouped so that an amplifier is assigned to a certain number of adjacent pixels. In the case where grouped channel or pixels should output the same line or display data, only a portion of the amplifiers (e.g., one amplifier) connected to the channels or pixels may be operated to amplify and output the line data, so as to save power.

According to one embodiment of the present disclosure, the source driver 206 may check the comparison value information received from the data latch 205, and if the comparison value information indicates that the line data being compared is the same, the source driver 206 may turn on only a portion or one of the amplifiers related to the grouped channels or pixels. Then, the amplified display signal may be equally applied to the grouped channels or pixels. According to one embodiment of the present disclosure, the source driver 206 may check the comparison value information received from the data latch 205, and if the comparison value information indicates that the line data being compared is not the same or substantially the same, the source driver 206 may turn on all the amplifiers related to the grouped channels or pixels. Output from all the turned-on amplifiers may be applied to each channel or pixel.

The gate driver 207 may drive gate lines of the display panel 160. That is, as operation of the pixels arranged in the display panel 160 is controlled by the source driver 206 and the gate driver 207, the display data (or an image corresponding to the display data) input from the processor 140 may be displayed on the display panel 160.

Figure 3:
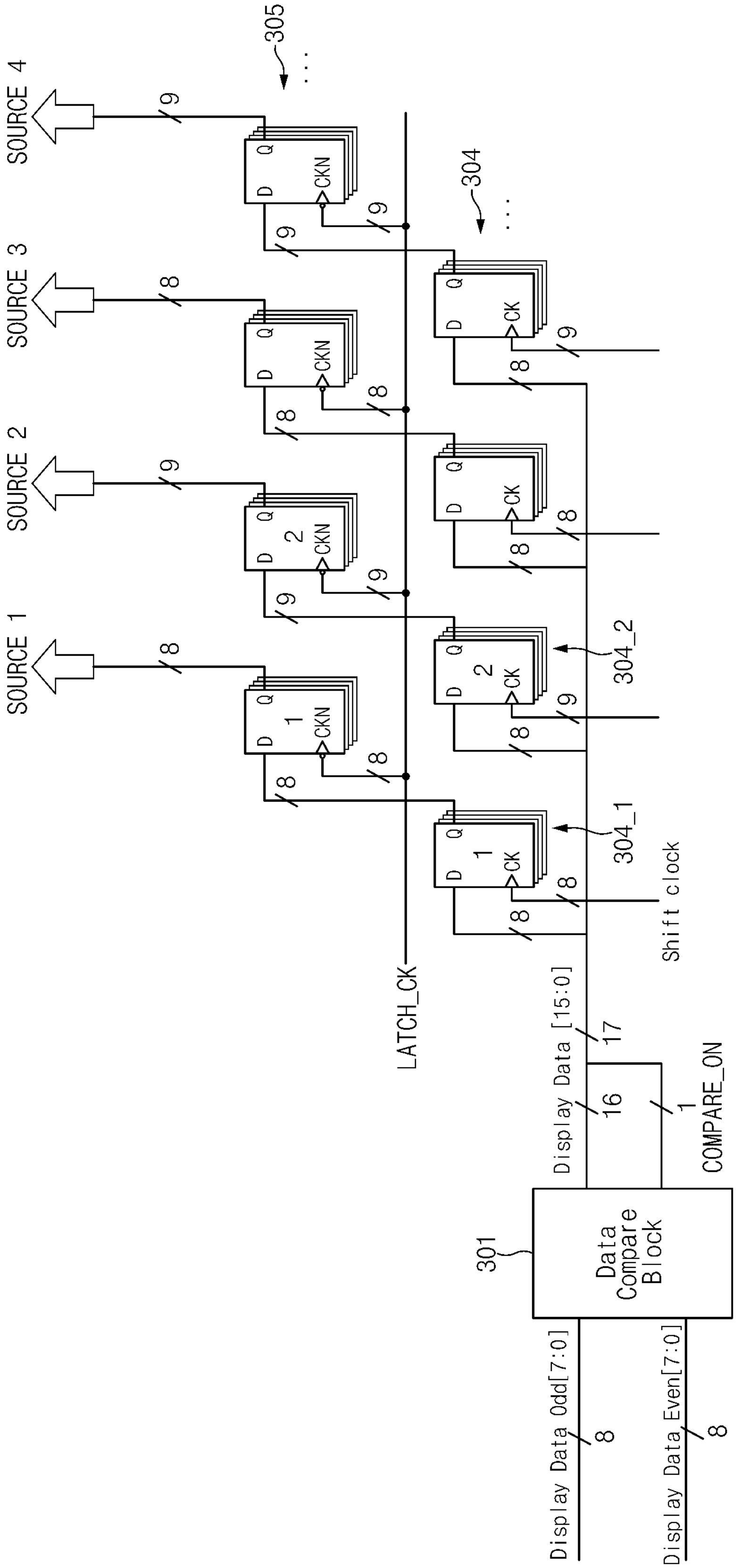
FIG. 3 is a diagram illustrating an example of a part of a display driver module operated based on a shift register for each channel according to an embodiment of the present disclosure.

FIG. 3 is a diagram illustrating an example of a part of a display driver module operated based on a channel-based shift register according to an embodiment of the present disclosure.

Referring to FIG. 3, a part of the display driver module 200 may include, for example, a data comparison circuit 301 included in the logic circuit block 202, a data shift register 304 (e.g., the data shift register 204), and a data latch 305 (e.g., the data latch 205).

The data shift register 304 may include, for example, shift registers corresponding to a plurality of channels. For example, the data shift register 304 may include registers capable of processing 8 bits corresponding to sub-pixels for each color of a pixel. According to one embodiments of the present disclosure, the data shift registers 304 may be grouped into groups of a certain number of members (e.g., two members) for each channel (e.g. two data shift registers for storing 8 bits corresponding to sub-pixels of a color, e.g. red, of two pixels), and register characteristics of grouped channels may be different from each other. For example, a data shift register 304_1 may correspond to a first channel among the grouped channels and may include a register capable of processing 8 bits, and a data shift register 304_2 may correspond to a second channel and may include a register capable of processing 8 bits for the display data and 1 bit for the comparison value information. The number of members to be grouped may be three or more according to design choice.

The data comparison circuit 301 may be built in the logic circuit block 202. The data comparison circuit 301 may compare display data provided to the data shift register 304. According to an embodiment of the present disclosure, the data comparison circuit 301 may compare display data for grouped channels. For example, the data comparison circuit 301 may compare data to be supplied to the data shift register 304_1 corresponding to the first channel belonging to a first group and the data shift register 304_2 corresponding to the second channel belonging to the first group. In the case where data supplied to the data shift register 304_1 is identical to data to be supplied to the data shift register 304_2, the data comparison circuit 301 may store the display data to the data shift register 304_1 and may store the display data and the comparison value information (information indicating data sameness) to the data shift register 304_2. The data comparison circuit 301 may compare the display data of data shift registers belonging to other groups. The data comparison circuit 301 may provide the comparison value information corresponding to a comparison result to the data shift registers corresponding to the second channel of each group together with the display data. The data comparison circuit 301 may sequentially store data into each data shift register, and may store the comparison value information to the data shift registers corresponding to all but one of the channels (e.g. the reference channel used for the comparison) in the group.

When storing the display data to the data shift registers 304 is completed, the data latch 305 may receive the input display data, and may transfer the display data to the source driver 206. The source driver 206 may check received display data, may generate a signal corresponding to the display data, and may supply the signal to the display panel for each channel. In this operation, among the amplifiers included in the source driver 206, the amplifier which has received data where the comparison value information indicates sameness may be disabled. The source driver 206 may replace the output from the channel having the comparison value information indicating sameness with the amplifier output of for example, the reference channel.

Figure 4:
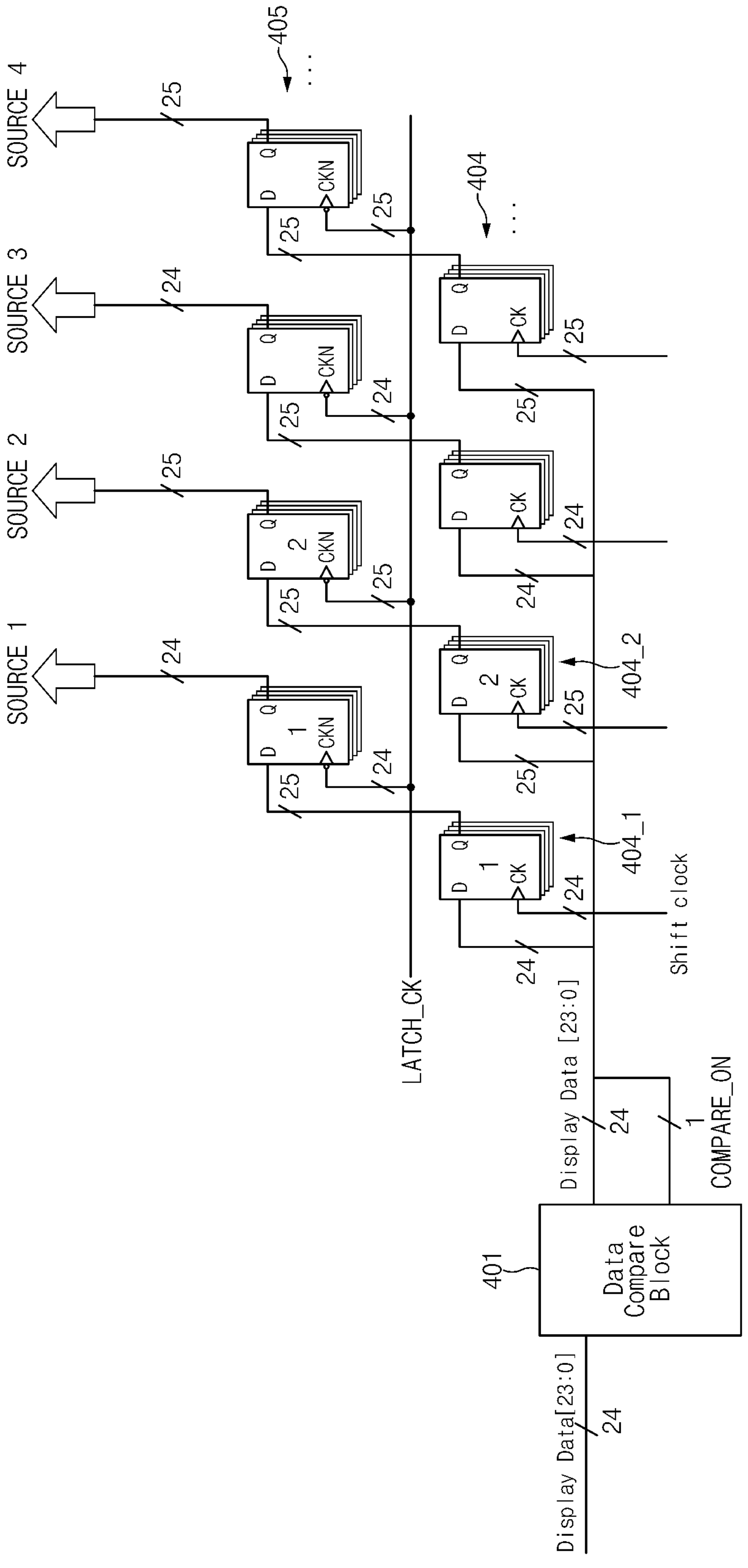
FIG. 4 is a diagram illustrating another example of a part of a display driver module operated based on a shift register for each pixel according to an embodiment of the present disclosure.

FIG. 4 is a diagram illustrating another example of a part of a display driver module operated based on a pixel-based shift register according to an embodiment of the present disclosure.

Referring to FIG. 4, a part of the display driver module 200 may include, for example, a data comparison circuit 401 included in the logic circuit block 202, a data shift register 404 (e.g., the data shift register 204), and a data latch 405 (e.g., the data latch 205).

The data shift register 404 may include, for example, shift registers corresponding to a plurality of pixels. For example, the data shift register 404 may include registers capable of processing 24 bits corresponding to a pixel. According to various embodiments of the present disclosure, the data shift registers 404 may be grouped into groups of a certain number of members, where each member corresponds to a pixel. A data shift register 404_1 may correspond to a first pixel among grouped pixels and may include a register capable of processing 24 bits, and a data shift register 404_2 may correspond to a second pixel and may include a register capable of processing 24 bits for the display data and 1 bit for the comparison value information. The number of members to be grouped may be three or more according to design choice.

The data comparison circuit 401 may be built in the logic circuit block 202. The data comparison circuit 401 may compare display data provided to the data shift register 404. According to an embodiment of the present disclosure, the data comparison circuit 401 may compare display data for grouped pixels. For example, the data comparison circuit 401 may compare data to be supplied to the data shift register 404_1 corresponding to the first pixel belonging to a first group and the data shift register 404_2 corresponding to the second pixel belonging to the first group. In the case where data supplied to the data shift register 401_1 is identical to data to be supplied to the data shift register 404_2, the data comparison circuit 401 may store 24-bit display data to the data shift register 404_1 and may store the 24-bit display data and 1-bit comparison value information (information indicating data sameness) to the data shift register 404_2. The data comparison circuit 401 may compare the display data of data shift registers belonging to other groups. The data comparison circuit 401 may provide the comparison value information corresponding to a comparison result to the data shift registers corresponding to the second pixel of each group together with the display data. The data comparison circuit 401 may sequentially store the display data into each data shift register, and may store the comparison value information to corresponding data shift registers. The comparison value information may be stored for all pixels in the group except for one pixel (e.g. the reference pixel used for the comparison).

When storing the display data to the data shift registers 404 is completed, the data latch 405 may receive the input display data, and may transfer the display data to the source driver 206. The source driver 206 may check received display data, may generate a signal corresponding to the display data, and may supply the signal to the display panel for each pixel. In this operation, among the amplifiers included in the source driver 206, the amplifier which has received where the comparison value information indicates sameness may be disabled. The output from the pixel having the same comparison value information may be replaced with the amplifier output of the reference pixel.

As described above, the electronic device 100 sequentially transfers the display data to the source driver using the shift register in order to display data. In relation to this operation, in the electronic device 100, a display data comparison block may be disposed at an input of a shift register stage, so that a flag signal corresponding to the sameness comparison value information (e.g., a flagged state value) may be transferred to the source driver via a shift register line to thereby operate the amplifiers corresponding to the channels or pixels.

Figure 5:
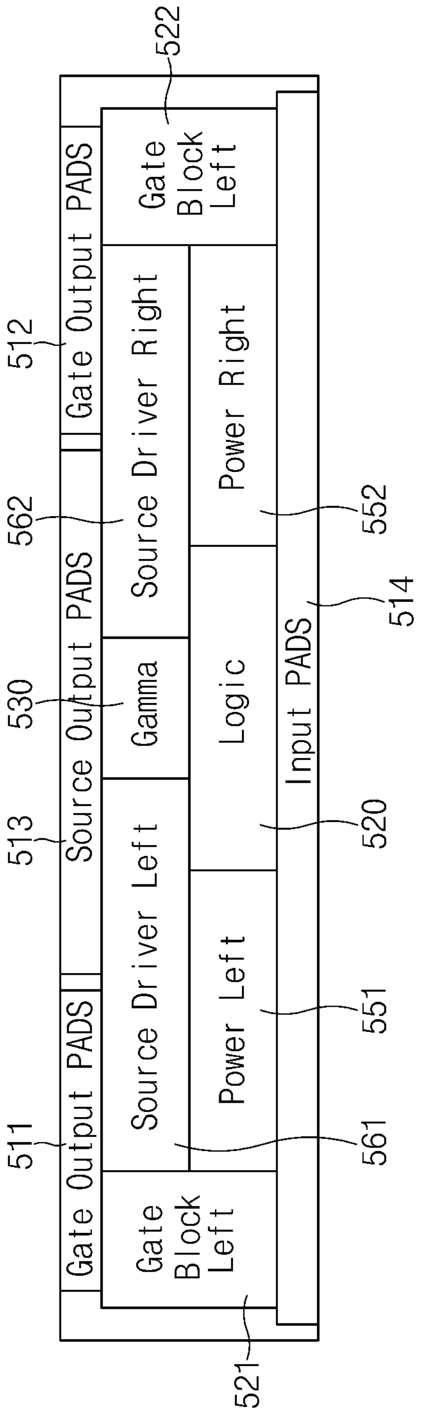
FIG. 5 is a diagram illustrating an example of a part of a display driver module according to an embodiment of the present disclosure.

FIG. 5 is a diagram illustrating an example of a part of a display driver module according to an embodiment of the present disclosure.

Referring to FIG. 5, the display driver module 200 according to an embodiment of the present disclosure may include first gate output pads 511, source pads 513, second gate output pads 512, a first gate block 521, a second gate block 522, a first source driver 561, a second source driver 562, a first power block 551, a second power block 552, a gamma block 530, a logic circuit block 520 (e.g., the logic circuit block 202), and input pads 514. The first source driver 561 and the second source driver 562 may be included in the source driver 206 described above with reference to FIG. 2. The first gate block 521 and the second gate block 522 may be included in the gate driver 207 described above with reference to FIG. 2.

The first gate output pads 511 may include pads which electrically contact gate lines arranged in the display panel 160. According to an embodiment of the present disclosure, the first gate output pads 511 may include pads which electrically contact a subset of gate lines (e.g., gate lines arranged at an upper half side or a lower half side of the display panel 160) among the gate lines included in the display panel 160. A signal generated in the first gate block 521 may be supplied to the first gate output pads 511.

The source pads 513 may include pads connected to data lines of the display panel 160. The source pads 513 may receive signals generated in the first source driver 561 and the second source driver 562, and may output the signals to each data line of the display panel 160.

The second gate output pads 512 may include pads which electrically contact another subset of gate lines (e.g., gate lines arranged at a lower half side) among the gate lines included in the display panel 160. A signal generated in the second gate block 522 may be supplied to the second gate output pads 512.

The first gate block 521 may generate gate signals to be supplied to the first gate output pads 511. The first gate block 521 may sequentially supply generated gate signals to the first gate output pads 511. The second gate block 522 may generate gate signals to be supplied to the second gate output pads 512. The second gate block 522 may sequentially supply generated gate signals to the second gate output pads 512. The first gate block 521 and the second gate block 522 may be synchronously operated. For example, the first gate block 521 and the second gate block 522 may be operated such that the second gate block 522 supplies a signal to a first gate line of the second gate output pads 512 after the first gate block 521 supplies a signal to a last gate line of the first gate output pads 511.

The first source driver 561 may supply a signal corresponding to the display data to some of the data lines of the display panel 160. Assuming in one example that the display panel 160 is divided into a left half side and a right half side with respect to a virtual center line, the first source driver 561 may supply the signal corresponding to the display data to data lines arranged at the left half side. The second source driver 562, for example, may supply a signal corresponding to the display data to data lines arranged at the right half side of the display panel 160. The reverse, i.e. the first source driver 561 supplying the right half side and the second source driver 562 supplying the left half side, is also possible. Amplifiers included in the first source driver 561 and the second source driver 562 may be enabled or disabled according to the comparison value information provided from the logic circuit block 202. For example, among the amplifiers included in the first source driver 561 and the second source driver 562, the amplifier which has received the comparison value information indicating sameness may be disabled. Among the amplifiers included in the first source driver 561 and the second source driver 562, the amplifier which has received comparison value information indicating mismatch or lack of sameness may be enabled.

The first power block 551 may supply power for generating signals of the first gate block 521 and the first source driver 561. The second power block 552 may supply power for generating signals of the second gate block 522 and the second source driver 562.

The gamma block 530 may generate a gamma voltage corresponding to the display data. The gamma block 530 may provide a generated gamma voltage to the first source driver 561 and the second source driver 562.

As described above, the logic circuit block 520 may include controllers related to memory access, and may perform an operation of reading or writing the display data. According to an embodiment of the present disclosure, the logic circuit block 520 may include the data comparison circuit described above with reference to FIGS. 3 and 4. The logic circuit block 520 may determine whether the same or substantially the same display data are to be stored in registers of grouped channels or pixels. In the case where the same or substantially the same display data are in the registers, the logic circuit block 520 may provide information corresponding to the sameness comparison value information to the source driver. In the case where display data having different values, the logic circuit block 520 may provide information corresponding to the mismatch comparison value information to the source driver. In this operation, the logic circuit block 520 may provide the sameness comparison value information to amplifiers of the source driver (some of amplifiers connected to grouped channels or pixels) so that the corresponding amplifiers may be disabled. The logic circuit block 520 may provide the mismatch comparison value information to the amplifiers of the source driver so that the amplifiers may be enabled. Accordingly, power may be saved because amplifiers corresponding to display data that is identical to another piece of display data is not powered.

The input pads 514 may include pads connected to the first gate block 521, the first power block 551, the logic circuit block 520, the second power block 552, and the second gate block 522. The input pads 514 may be electrically connected to an external system module (e.g., a processor or an AP), and may receive a signal provided from the external system module.

Figure 6:
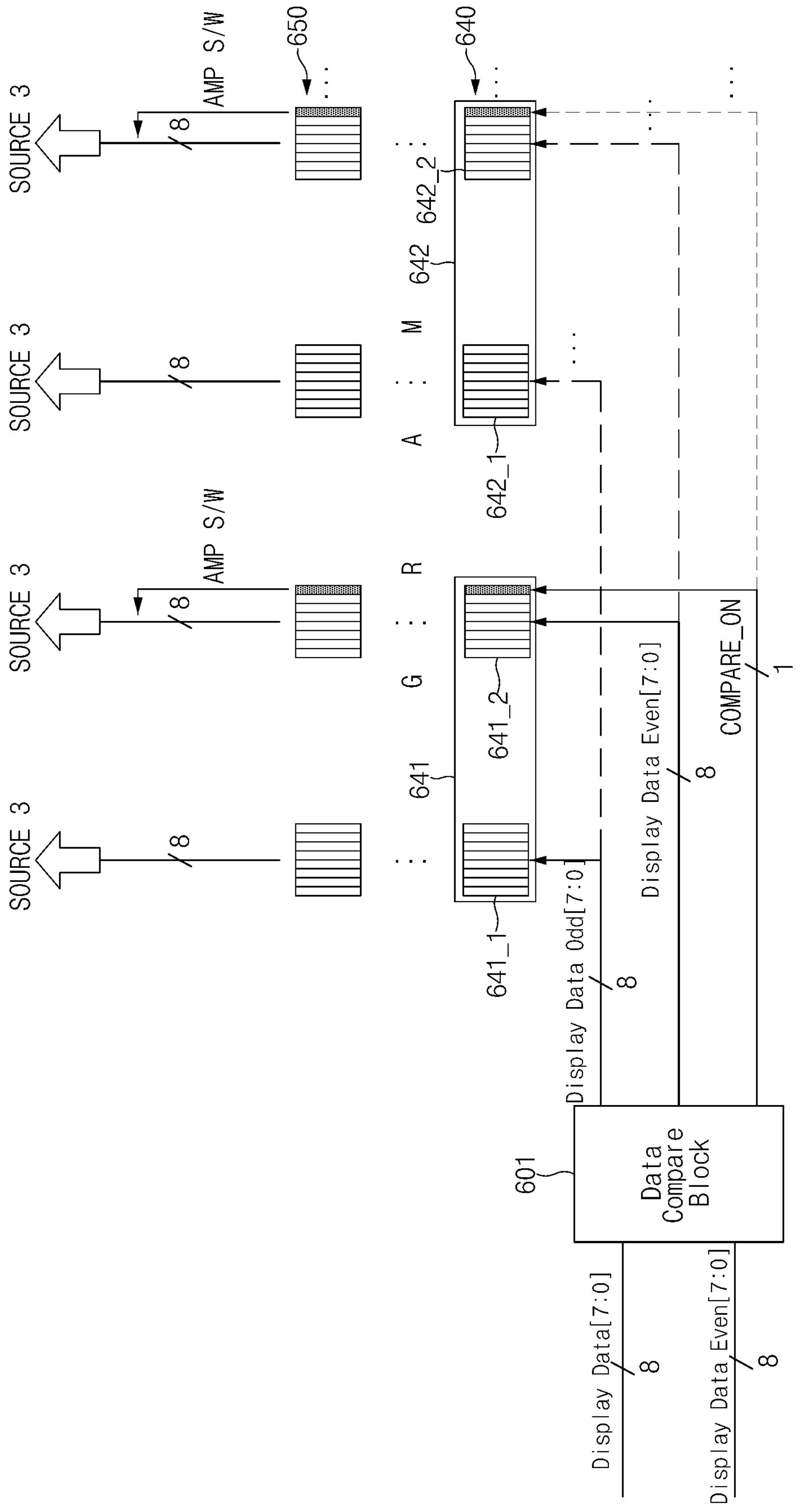
FIG. 6 is a diagram illustrating an example of a part of a display driver module operated based on a memory according to an embodiment of the present disclosure.

FIG. 6 is a diagram illustrating an example of a part of a display driver module operated based on a memory according to an embodiment of the present disclosure.

Referring to FIG. 6, the display driver module 200 may include a data comparison block 601, a shift memory 640, and a latch memory 650.

The shift memory 640 may include a memory connected to amplifiers arranged for each channel in each source driver 206. The shift memory 640, for example, may perform the same function as the data shift register 304 described above with reference to FIG. 4. However, the shift memory 640 may be provided as a GRAM type. The shift memory 640 may include, for example, a plurality of groups including a channel memory 641_1 for storing an 8-bit signal for a channel (e.g. a red color channel) of a pixel and a channel memory 641_2 for storing a 9-bit signal for the channel of another pixel. The channel memory 641_1 may store the display data. The channel memory 641_2 may store the display data and the comparison value information.

According to one embodiment of the present disclosure, a first group 641 of the shift memory 640 may be related to the same color. For example, a first channel memory and a second channel memory of the first group 641 may store a value representing a red color. The first channel memory and the second channel memory of a second group 642 may store a value representing a green color or a blue color. According to one embodiment of the present disclosure, the shift memory 640 may include a larger number of channels for each group. For example, the shift memory 640 may include there or more channels related to the same color for each group.

The data comparison block 601 may include a block or logic for comparing data supplied to the shift memory 640. For example, the data comparison block 601 may determine whether the display data to be stored the channel memory 641_1 and the channel memory 641_2 are the same. In the case where the supplied display data are the same, the data comparison block 601 may store the comparison value information to indicate sameness in the corresponding memory. According to an embodiment of the present disclosure, the data comparison block 601 may store the sameness comparison value information or mismatch comparison value information in a 9th bit of the channel memory 641_2. The data comparison block 601 may compare the display data supplied to a channel memory 642_1 and a channel memory 642_2 to determine whether the display data are the same and may provide the comparison value information.

If storing the display data in the shift memory 640 is completed, the latch memory 650 may store all the display data stored in the shift memory 640 at once. The latch memory 650 may transfer, to the source driver 206, the memory information stored at once.

Figure 7:
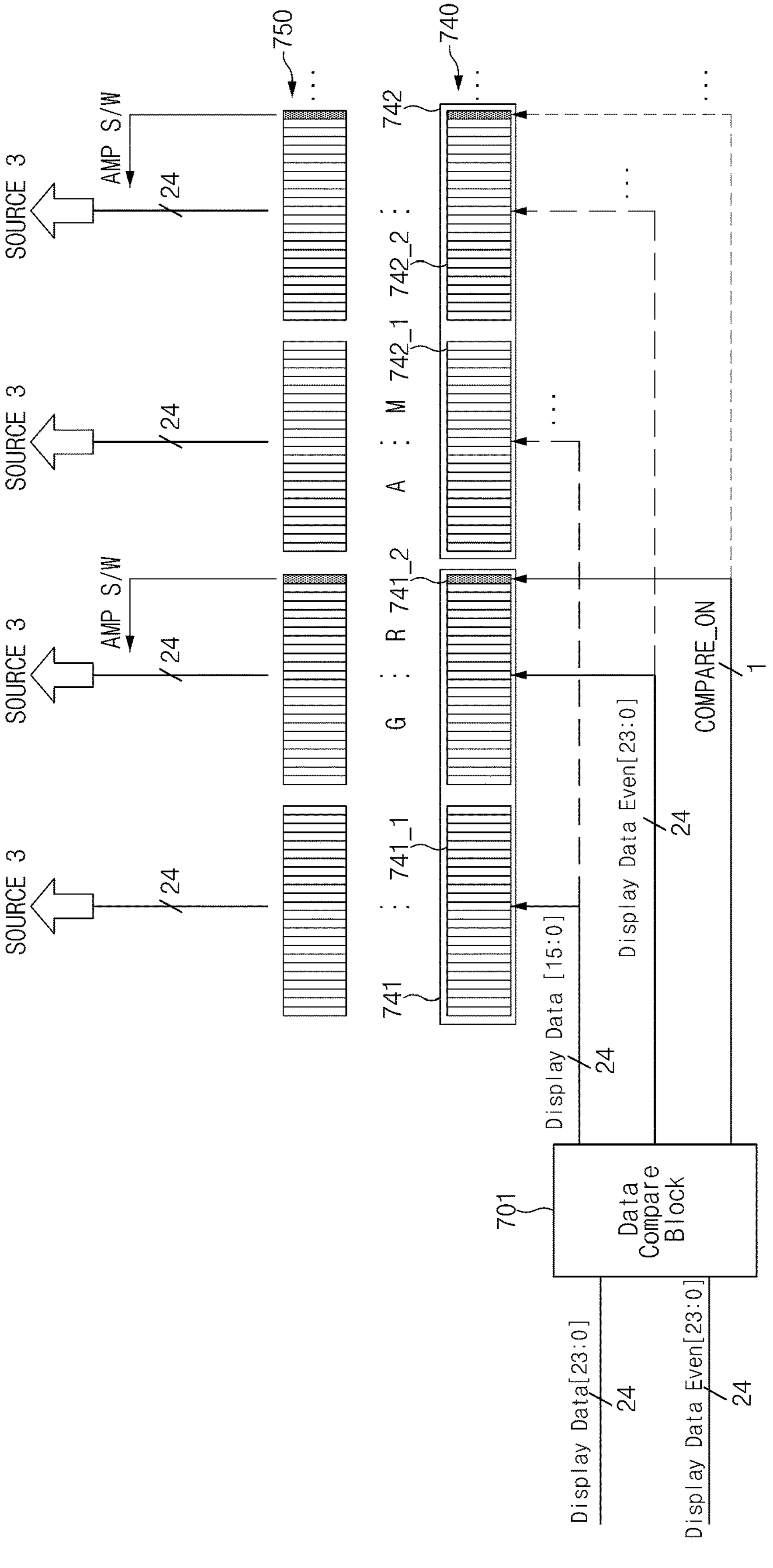
FIG. 7 is a diagram illustrating another example of a part of a display driver module operated based on a memory according to an embodiment of the present disclosure.

FIG. 7 is a diagram illustrating another example of a part of a display driver module operated based on a memory according to an embodiment of the present disclosure.

Referring to FIG. 7, the display driver module 200 may include a data comparison block 701, a shift memory 740, and a latch memory 750.

The shift memory 740 may include a memory connected to amplifiers arranged for each pixel in each source driver 206. The shift memory 740, for example, may perform the same function as the data shift register 404 described above with reference to FIG. 5. The shift memory 740 may be provided as a GRAM type. The shift memory 740 may include, for example, a plurality of groups including a pixel memory 741_1 for storing a 24-bit signal for each pixel and a pixel memory 741_2 for storing a 25-bit signal for each pixel. The pixel memory 741_1 may store the display data. The pixel memory 741_2 may store the display data and the comparison value information. According to one embodiment of the present disclosure, the shift memory 740 may include a larger number of pixels for each group. For example, the shift memory 740 may include three or more pixels in each group.

The data comparison block 701 may include a block or logic for comparing data supplied to the shift memory 740. For example, the data comparison block 701 may determine whether the display data to be stored the pixel memory

741_1 and the pixel memory 741_2 are the same. In the case where the supplied display data are the same, the data comparison block 701 may store the comparison value information indicating sameness in the corresponding memory. According to an embodiment of the present disclosure, the data comparison block 701 may store the same comparison value information or mismatch comparison value information in a 25th bit of the pixel memory 741_2. The data comparison block 701 may compare the display data supplied to a pixel memory 742_1 and a pixel memory 742_2 belonging to a next group to determine whether the display data are the same and may provide the comparison value information.

If storing the display data in the shift memory 740 is completed, the latch memory 750 may store the display data at once. The latch memory 750 may transfer, to the source driver 206, the memory information stored at once.

Figure 8:
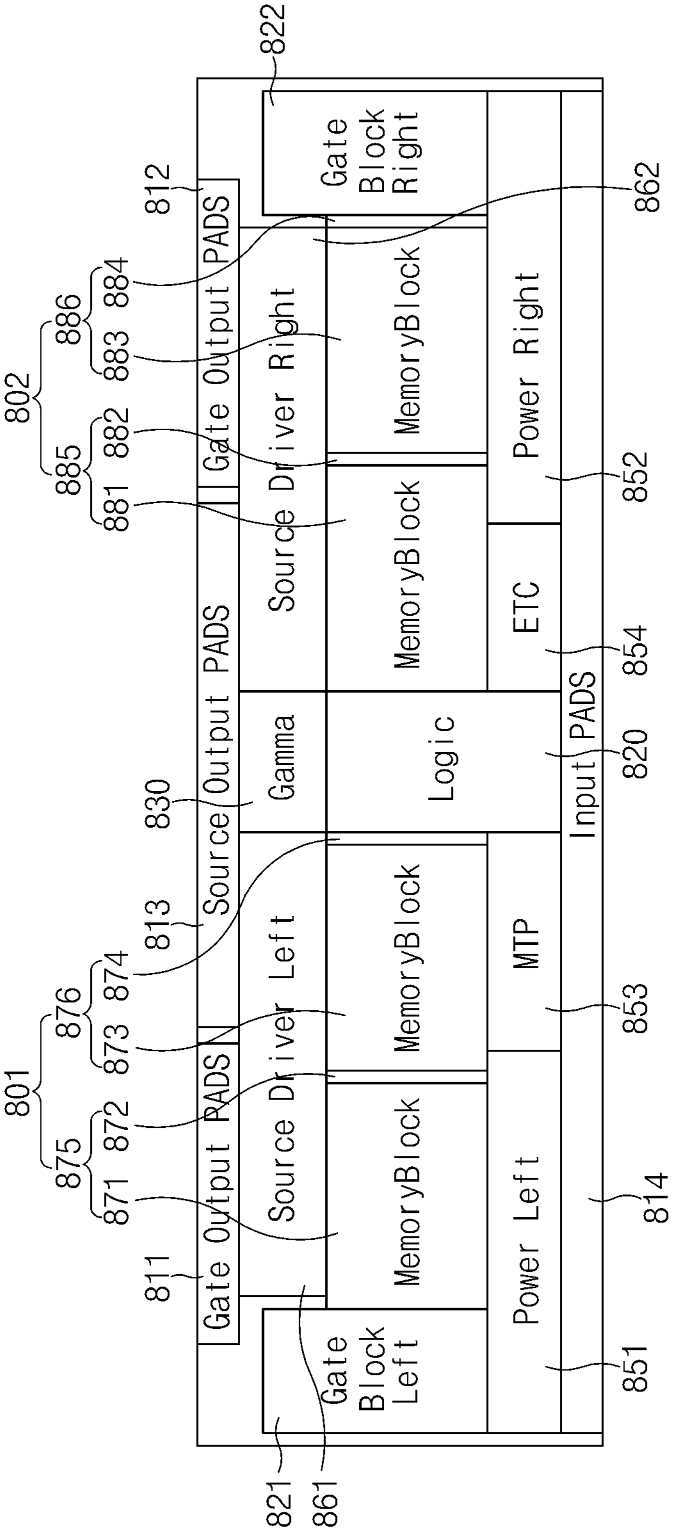
FIG. 8 is a diagram illustrating an example of a part of a display driver module operated based on a memory according to an embodiment of the present disclosure.

FIG. 8 is a diagram illustrating an example of a part of a display driver module operated based on a memory according to an embodiment of the present disclosure.

Referring to FIG. 8, the display driver module 200 according to an embodiment of the present disclosure may include first gate output pads 811, source pads 813, second gate output pads 812, a first gate block 821, a second gate block 822, a first source driver 861, a second source driver 862, a first power block 851, a second power block 852, a gamma block 830, a logic circuit block 820, and input pads 814. Furthermore, the display driver module 200 may include first memory blocks 801 between the first source driver 861 and the first power block 851, and second memory blocks 802, a multiple time programmable (MTP) memory 853, and an exchange terminal circuit (ETC) 854 between the second source driver 862 and the second power block 852.

The above-mentioned elements of the display driver module 200, excepting the first memory blocks 801, the MTP 853, and the ETC 854, may perform operations which are the same as or similar to the operations performed by the elements described above with reference to FIG. 5.

The first memory blocks 801 may include sub memory blocks, for example, a memory block 875 and a memory block 876. The memory block 875 may include a memory block 871 for storing the display data and a memory block 872 for storing the comparison value information. The memory block 876 may also include a memory block 873 for storing the display data and a memory block 874 for storing the comparison value information. The memory block 875 and the memory block 876 may transfer the stored display data and comparison value information to the first source driver 861.

The second memory blocks 802 may include sub memory blocks, for example, a memory block 885 and a memory block 886. The memory block 885 may include a memory block 881 for storing the display data and a memory block 882 for storing the comparison value information. The memory block 886 may include a memory block 883 for storing the display data and a memory block 884 for storing the comparison value information. The memory block 885 and the memory block 886 may transfer the stored display data and comparison value information to the second source driver 862.

Although it has been described that the first memory blocks 801 and the second memory blocks 802 include some sub memory blocks, embodiments of the present disclosure are not limited thereto. For example, the first memory blocks 801 and the second memory blocks 802 may include more sub memory blocks. According to one embodiment of the present disclosure, the first memory blocks 801 and the second memory blocks 802 may include sub memory blocks, the number of which corresponds to the number of channels or to the number of pixels.

The logic circuit block 820 may compare the display data to be supplied to channels or pixels in the groups to determine whether the display data to be supplied to the sub memory blocks are the same. In the case where the display data to be supplied are the same, the logic circuit block 820 may provide the same comparison value information so that the amplifier associated with the memory block is disabled. According to an embodiment of the present disclosure, the logic circuit block 820 may provide the display data to a first sub memory block, and may provide the display data and the same comparison value information (or mismatch comparison value information) to at least one second sub memory block grouped with the first sub memory block.

As described above, in a structure in which a frame buffer (e.g., a memory) is disposed within the display driver module in the electronic device 100, a data comparator may be disposed at a front stage of the frame buffer. For example, since the electronic device 100 stores the display data in a GRAM and outputs the data in a batch for each line, the electronic device 100 may include a display data comparison block disposed at an input stage of a memory. In the case where the data for a plurality of channels, for example, two channels, are the same, the electronic device 100 may generate a flag bit, and may store it in a GRAM space to which an additional 1 bit in a memory block is allocated. When outputting the display data, the electronic device 100 may also transfer the flag bit to the source deriver so as to turn on/off an amplifier associated with the memory block. In the above-mentioned structure, a size of the memory may be smaller than a size of a data comparator. Accordingly, an area occupied by the display driver module in a display module may be generally reduced due to reducing of a height by deleting the data comparator even though a size of the memory is increased.

Figure 9:
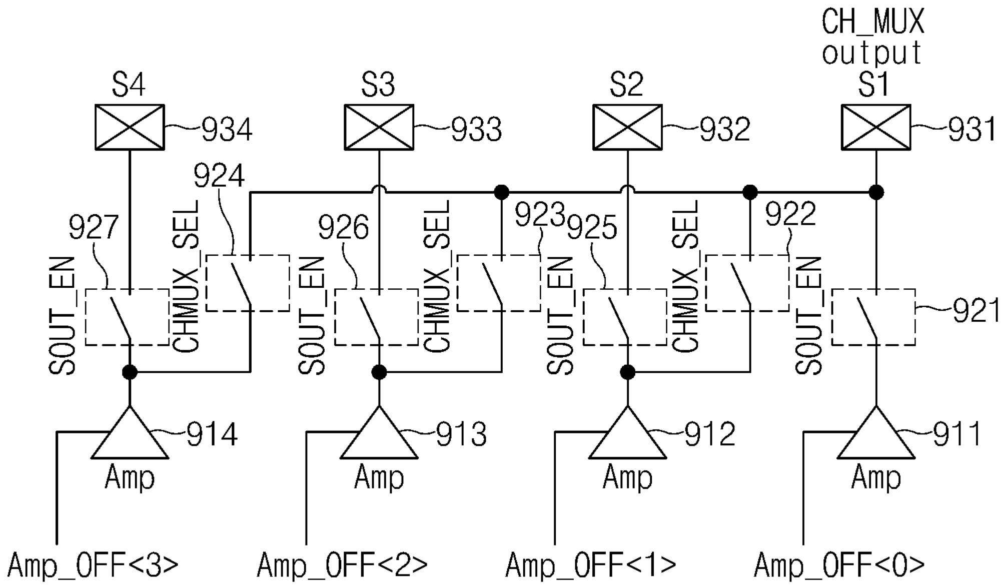
FIG. 9 is a diagram illustrating an example of a part of a source driver operated based on grouped channels according to an embodiment of the present disclosure.

FIG. 9 is a diagram illustrating an example of a part of a source driver operated based on grouped channels according to an embodiment of the present disclosure.

Referring to FIG. 9, a part of the source driver 206 may include, for example, an amplifier 911, an amplifier 912, an amplifier 913, and an amplifier 914. The amplifier 911 may be connected to a source pad 931, the amplifier 912 may be connected to a source pad 932, the amplifier 913 may be connected to the source pad 933, and the amplifier 914 may be connected to a source pad 934.

The source pad 931, for example, may be used as a channel MUX (multiplexed) output. A switch 921 may be disposed between the source pad 931 and the amplifier 911. A switch 922 may be disposed between the source pad 931 and the amplifier 912, a switch 923 may be disposed between the source pad 931 and the amplifier 913, and a switch 924 may be disposed between the source pad 931 and the amplifier 914.

A switch 925 may be disposed between the source pad 932 and the amplifier 912. A switch 926 may be disposed between the source pad 933 and the amplifier 913. A switch 927 may be disposed between the source pad 934 and the amplifier 914.

A first amplifier control signal (Amp_OFF<0> or Amp_ON<0> for turning on/off an amplifier) may be supplied to the amplifier 911. A second amplifier control signal (Amp_OFF<1> or Amp_ON<1>) may be supplied to the amplifier 912. A third amplifier control signal (Amp_OFF<2> or Amp_ON<2>) may be supplied to the amplifier 913. A fourth amplifier control signal (Amp_OFF<3> or Amp_ON<3>) may be supplied to the amplifier 914. The first amplifier control signal, the second amplifier control signal, the third amplifier control signal, and the fourth amplifier control signal may be provided from, for example, the logic circuit block.

According to one embodiment of the present disclosure, a switch control signal SOUT_EN may be supplied to the switch 921 from the logic circuit block. A channel MUX selection signal CHMUX_SEL may be supplied to the switch 922, the switch 923, and the switch 924 from the logic circuit block. The switch control signal SOUT_EN may be supplied to the switch 925, the switch 926, and the switch 927 from the logic circuit block.

As described above, the source driver may have a structure in which connections between amplifiers and source pads for each channel or pixel may be released or changed by switches. The source driver may selectively drive the display 160 in a normal mode, a test mode (EPS), or a multi-channel mode.

When in the normal mode, the source driver is one-to-one mapped to an amplifier for each channel (or each pixel). In this operation, the source driver may integrate a switch control signal and a channel MUX selection signal into one so as to drive the amplifiers a reduced number of signal lines. Furthermore, when driving the same display data for each source channel, the source driver may perform the simultaneous multi-channel driving in which one amplifier is driven using the channel MUX selection signal, and only one output is transmitted. For example, in the case where all the display data are the same, the source driver having the above-mentioned structure may receive, from the logic circuit block, a signal for disabling some amplifiers, for example, the amplifier 912, the amplifier 913, and the amplifier 914. Accordingly, only the amplifier 911 is enabled. The amplifier 911 may provide an amplified output not only to the source pad 931 but also to the source pad 932, the source pad 933, and the source pad 934. In relation to this operation, the logic circuit block may supply the channel MUX selection signal for turning on the switch 922, the switch 923, and the switch 924, and may supply the switch control signal SOUT_EN for turning on the switch 925, the switch 926, and the switch 927. Accordingly, the output from the amplifier 911 may also be supplied to other source pads.

According to various embodiments of the present disclosure, the above-mentioned first to fourth source pads 931 to 934 may be pads grouped for the same channels (e.g., red channels, green channels, or blue channels).

According to one embodiment of the present disclosure, a display driver module according to an embodiment of the present disclosure may be configured to receive display data, divide the display data into a plurality of segments corresponding to a plurality of display regions, compare the display data in the plurality of segments to determine whether the display data in at least one segment is same as the display data in another segment, when the display data in the at least one segment is not the same as the display data in another segment, amplify a first display signal generated from the display data in at least one segment, and display the amplified first display signal in a first display region corresponding to the at least one segment; and when the display data in the at least one segment is the same as the display data in another segment, amplify a second display signal generated from the display data in the another segment, and display the amplified second display signal in the first display region and a second display region corresponding to the another segment.

According to one embodiment of the present disclosure, the segments, for example, may correspond to groups of a certain number of members, and a plurality of amplifiers for amplifying a display data signal to be supplied to each segment.

According to one embodiment of the present disclosure, a data shift register or a memory may be provided for each segment of display data.

According to one embodiment of the present disclosure, the segments may also correspond to pixels or sub-pixels of a display of the electronic device.

According to the one embodiment of the present disclosure, a display driver module according to an embodiment of the present disclosure may include a plurality of amplifiers which amplify a display data signal to be supplied to each signal line of a display panel, and a logic circuit which groups the plurality of amplifiers and controls enablement or disablement of the amplifiers according to whether display data to be supplied to the grouped amplifiers are the same.

According to the above-mentioned various embodiments of the present disclosure, an electronic device may include a display driver module configured to receive display data, determine whether attributes of the display data are similar to each other, divide, if the attributes are not similar to each other, the display data into segments corresponding to a plurality of display regions and amplify and display the display data for each of the plurality of display regions and amplify and display, if the attributes are similar to each other, the display data without dividing the display data. According to one embodiment of the present disclosure, the display driver module may be further configured, when the display data in the at least one segment is the same as the display data in another segment, disable a first amplifier associated with the at least one segment.

According to one embodiment of the present disclosure, the display driver module may be further configured, when the display data in the at least one segment is the same as the display data in another segment, enable a second amplifier associated with the another segment while the first amplifier is disabled.

According to one embodiment of the present disclosure, the display driver module may be further configured to supply an output from the second amplifier to an output stage of the first amplifier.

According to one embodiment of the present disclosure, the electronic device may further include a data shift register or a memory for each segment of display data.

According to one embodiment of the present disclosure, the display driver module may output comparison value information associated with the at least one segment, the comparison value information representing a result of the comparison.

According to one embodiment of the present disclosure, each segment may correspond to a pixel or sub-pixel of a display of the electronic device.

According to various embodiments of the present disclosure, the display driver module may provide the display data to a specific pixel among grouped pixels, and provides the display data and comparison value information to remaining pixels.

According to one embodiment of the present disclosure, the electronic device may further include source pads connected to output stages of amplifiers associated with each segment, a switch disposed between each output stage and each source pad, and a channel selection switch disposed between the output stage of the amplifier associated with the at least one segment and the source pad associated with the another segment.

According to one embodiment of the present disclosure, the display driver module is further configured to display the amplified second display signal in the first display region and a second display region by turning on the channel selection switch.

According to various embodiments of the present disclosure, the display driver module is configured to perform any one of an operation for a case in which inter-channel values of the display data are different from each other, an operation for a case in which output values of the grouped amplifiers are the same, and an operation of measuring a source output for a test by selecting some source pads, based on adjustment of a state of the switch or the channel selection switch.

According to one embodiment of the present disclosure, an electronic device according to an embodiment of the present disclosure may include a display driver module which groups a plurality of amplifiers for amplifying a display data signal to be supplied to each signal line of a display panel and controls enablement or disablement of the amplifiers according to whether display data to be supplied to the grouped amplifiers are the same, and a processor which supplies the display data signal to the display driver module.

According to one embodiment, the electronic device may further include the display panel which receives a signal output from the display driver module and outputs a screen.

According to one embodiments of the present disclosure, when supplying the same display data, the display driver module may disable remaining amplifiers other than a specified amplifier (e.g. the amplifier for the reference channel or pixel), so that an output from the specified amplifier may be supplied to source pads connected to the remaining amplifiers that are disabled.

According to one embodiment of the present disclosure, a display driver module may include a plurality of amplifiers configured to amplify a display data signal to be supplied to each signal line of a display panel and a logic circuit configured to group the plurality of amplifiers, and control enablement or disablement of the amplifiers according to whether display data to be supplied to the grouped amplifiers are the same, the logic circuit disables some of the grouped amplifiers or disables the grouped amplifiers excepting a specified amplifier if the display data are the same.

According to one embodiment of the present disclosure, the display driver module may further include a data shift register or a memory driven for each segment of the display data.

According to one embodiment of the present disclosure, the display driver module may further include a data shift register or a memory for segments of the display data that correspond to pixels or sub-pixels of a display of the electronic device.

Figure 10:
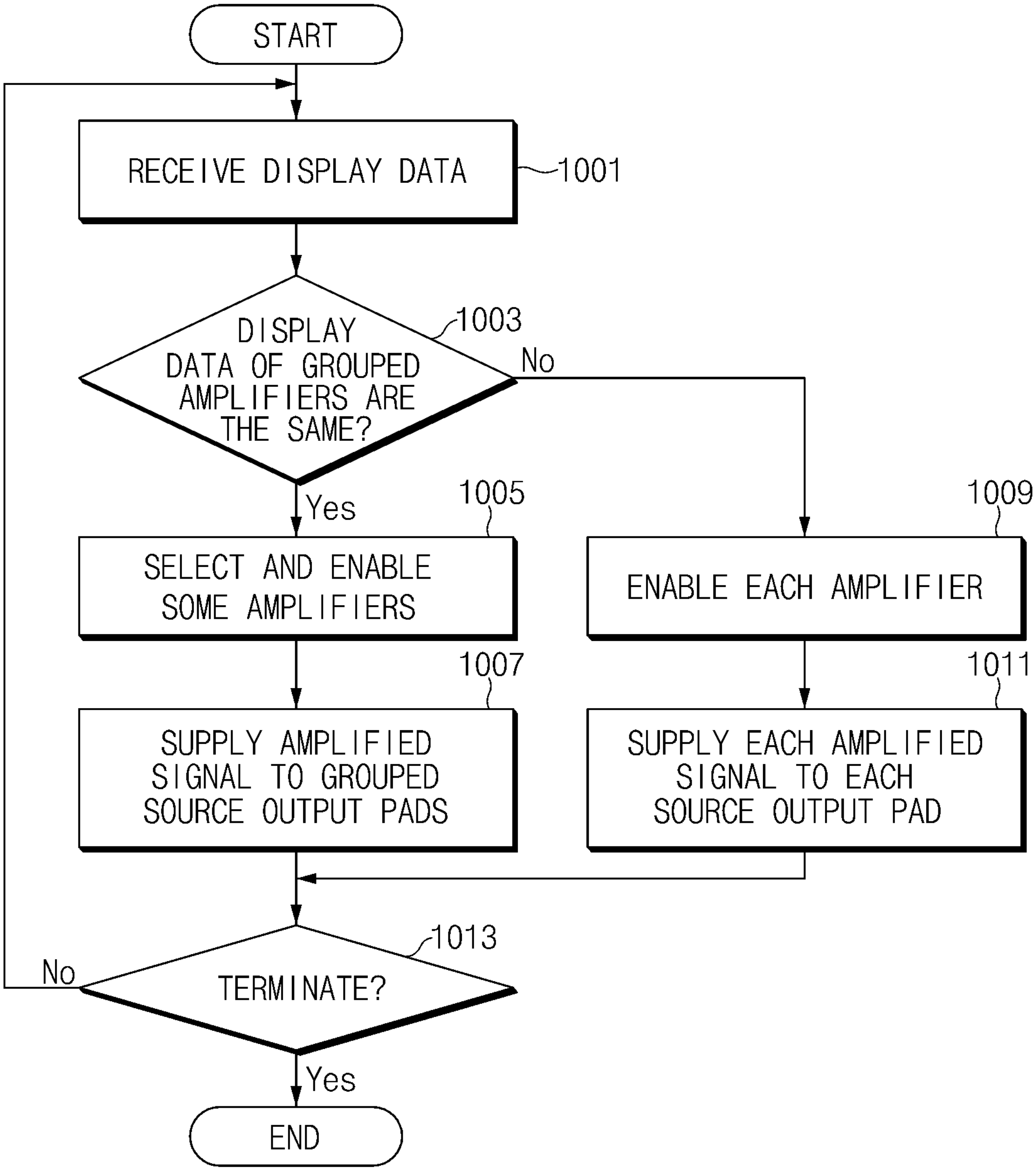
FIG. 10 is a flowchart illustrating a method for operating a display driver module according to an embodiment of the present disclosure.

FIG. 10 is a flowchart illustrating a method for operating a display driver module according to an embodiment of the present disclosure.

Referring to FIG. 10, in operation 1001, the display driver module 200 may receive display data from the processor 140.

In operation 1003, the display driver module 200 may determine whether the display data of grouped amplifiers are the same. The grouped amplifiers, for example, may have been grouped for each channel or pixel. Alternatively, amplifiers corresponding to channels representing a certain number of same colors may be grouped.

If the display data are the same, the display driver module 200 may select and enable some of amplifiers having the same display data in operation 1005. According to an embodiment of the present disclosure, the display driver module 200 may enable one of the grouped amplifiers. In the case where the display data are the same, the amplifier that the display driver module 200 enables may be fixed. Alternatively, in the case where the display data are the same, an amplifier that the display driver module 200 enables may vary. For example, in the case where the display data are the same at an arbitrary time point N, the display driver module 200 may enable an Nth amplifier among amplifiers of a specific group. Furthermore, in the case where the display data are the same at an arbitrary time point N+1, the display driver module 200 may enable an (N+1)th amplifier among amplifiers of the specific group.

In operation 1007, the display driver module 200 may supply signals output from the enabled amplifiers to grouped source pads. In relation to this operation, the display driver module 200 may turn on a channel selection switch connected to a specific source pad which receives the output from an enabled amplifier. Based on this configuration, an output signal from an amplifier associated with a specific source pad may also be supplied to other source pads.

If the display data are not the same, the display driver module 200 may enable each amplifier in operation 1009. In operation 1011, the display driver module 200 may supply the signals amplified by each amplifier to each source pad.

In operation 1013, the display driver module 200 may determine whether a termination event (e.g., a display operation stop request) occurs. If there is no operation stop request, the process may return to operation 1001 so that the display driver module 200 may re-perform operations 1001-1013. If the operation stop request is made, the display driver module 200 may terminate operations.

According to one embodiment of the present disclosure, a display driving method according to an embodiment of the present disclosure may include comparing display data to be supplied to grouped amplifiers, and controlling enablement or disablement of some of the grouped amplifiers according to whether the display data corresponding to the amplifiers are the same.

According to one embodiments of the present disclosure, a display driving method may include receiving display data, dividing the display data into a plurality of segments corresponding to a plurality of display regions, comparing the display data in the plurality of segments to determine whether the display data in at least one segment is same as the display data in another segment, when the display data in the at least one segment is not the same as the display data in another segment, amplifying a first display signal generated from the display data in at least one segment, and displaying the amplified first display signal in a first display region corresponding to the at least one segment, and when the display data in the at least one segment is the same as the display data in another segment, amplifying a second display signal generated from the display data in the another segment, and displaying the amplified second display signal in the first display region and a second display region corresponding to the another segment According to the above-mentioned various embodiments of the present disclosure, a display driving method may include receiving display data, determining whether attributes of the display data are similar to each other, dividing, if the attributes are not similar to each other, the display data into segments corresponding to a plurality of display regions and amplifying and displaying the display data for each of the plurality of display regions and amplifying and displaying, if the attributes are similar to each other, the display data without dividing the display data.

According to one of the present disclosure, when the display data in the at least one segment is the same as the display data in another segment, the displaying may include disabling a first amplifier associated with the at least one segment.

According to one embodiment of the present disclosure, when the display data in the at least one segment is the same as the display data in another segment, displaying may include enabling a second amplifier associated with the another segment while the first amplifier is disabled.

According to one embodiments of the present disclosure, the displaying may include supplying an output from the second amplifier to an output stage of the first amplifier.

According to one embodiment of the present disclosure, the determining may include comparing the display data to be supplied to amplifiers related to grouped channels to provide the display data to a specific channel among the grouped channels and provide the display data and comparison value information to the remaining channels among the grouped channels or comparing the display data to be supplied to amplifiers related to grouped pixels to provide the display data to a specific pixel among the grouped pixels and provide the display data and the comparison value information to the remaining pixels among the grouped pixels.

According to the various embodiments of the present disclosure, the method may further include performing any one of an operation for a case in which inter-channel values of the display data are different from each other, an operation for a case in which output values of grouped amplifiers are the same, and an operation of measuring a source output for a test by selecting some source pads, based on adjustment of a state of a switch disposed between an output stage of the grouped amplifiers and source pads or a channel selection switch disposed between a specified source pad among the source pads and the output stage of the grouped amplifiers.

Figure 11:
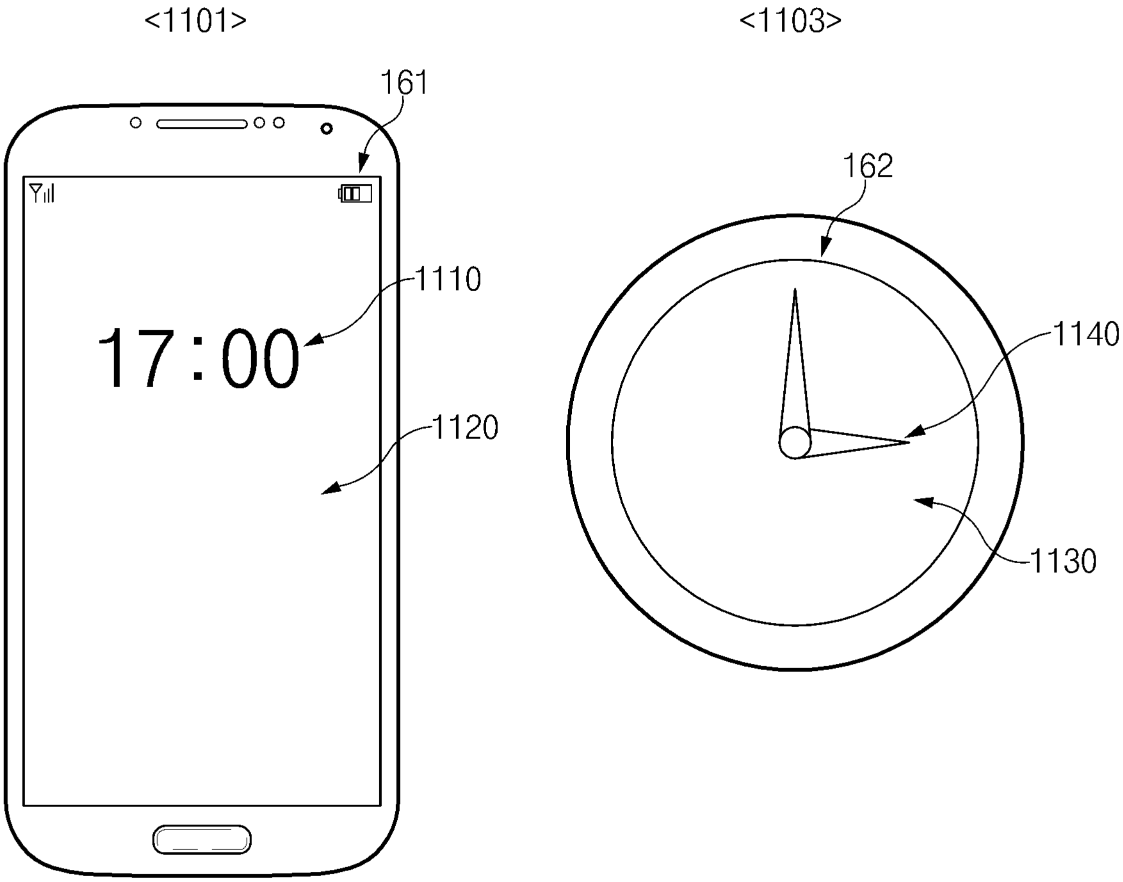
FIG. 11 is a diagram illustrating operation of an electronic device depending on display operation according to an embodiment of the present disclosure.

FIG. 11 is a diagram illustrating operation of an electronic device depending on display operation according to an embodiment of the present disclosure.

Referring to FIG. 11, as shown in a state 1101, the electronic device 100 may output a specified first screen 161 to a first display panel. For example, the electronic device 100 may output the first screen 161 when a home button is pressed or in response to execution of a specified function. The first screen 161 may include, for example, a first object 1110 and a second object 1120. For example, the first object 1110 may be a time display object, and the second object 1120 may be a background object.

Channels or pixels of the first object 1110 which are displayed in the same color may be displayed by receiving a signal amplified by one amplifier as described above in the present disclosure. Since the second object 1120 may displayed in the same color (e.g., black or white), the second object 1120 may be displayed by receiving a signal amplified by one amplifier or may be displayed in a black color due to disablement of an amplifier. In the case where the second object 1120 is displayed in a color such as blue, the electronic device 100 may disable amplifiers grouped by red channels or green channels, and may enable only some of amplifiers grouped by blue channels. Signals amplified by the enabled some amplifiers may be equally supplied to the blue channels of the corresponding group, so that the second object 1120 may be output in a blue color.

According to one embodiment of the present disclosure, the display module of the electronic device 100 may sequentially operate amplifiers in consideration of performance degradation of grouped amplifiers. For example, the electronic device 100 may enable an arbitrary amplifier (e.g., a first amplifier) among grouped amplifiers in relation to specific display data that are the same, and then may enable another arbitrary amplifier (e.g., a second amplifier) among the grouped amplifiers.

As shown in a state 1103, the electronic device 100 may output a specified second screen 162 to a second display panel. The electronic device 100, for example, may be a wearable electronic device such as a watch-type device. Therefore, the second display panel may have a circular (or rectangular or elliptical) shape. The second screen 162 may include, for example, a third object 1130 and a fourth object 1140. The third object 1130 may be a black background, and the fourth object 1140 may be a white region. The electronic device 100 may disable amplifiers related to the black background third object 1130.

The electronic device 100 may enable some of amplifiers grouped as pixel groups in relation to output of the white region fourth object 1140. For example, the electronic device 100 may enable one of the amplifiers grouped in a pixel group, and may supply output from the amplifier to other grouped pixels.

As described above, the electronic device 100 may group amplifiers, and may enable some of or one of the grouped amplifiers, according to characteristics of an output screen. The electronic device 100 may perform control so that an output from an enabled amplifier may be shared with other channels or pixels which output the same display data.

As described above, since the electronic device 100 drives multiple channels with some amplifiers or one amplifier (source amplifier associated with the reference channel or pixel), current consumption may be reduced. Furthermore, since a comparison circuit is added to a logic circuit block in the electronic device 100, an increase of a chip size may be minimized. Furthermore, if a data comparison block which causes an increase of the length of the short side is removed, the electronic device 100 may provide an advantageous condition for mounting a panel. The electronic device 100 may drive a multi-channel source line of two or more channels with one amplifier, and may turn off the other amplifiers. Therefore, an effect of reducing current consumption (e.g., reduction of analog driving current) of the display driver module (or display driver IC) may be provided. The electronic device 100 may apply the same principle not only for amplifier driving but also for inverter-based binary driving. The electronic device 100 may compare the display data at an output stage of a digital IP block.

According to various embodiments of the present disclosure, a display may be driven with low power so that power consumption may be reduced.

Furthermore, according to various embodiments of the present disclosure, a relatively slim chipset may be implemented, so that an electronic device may be made slim.

Figure 12:
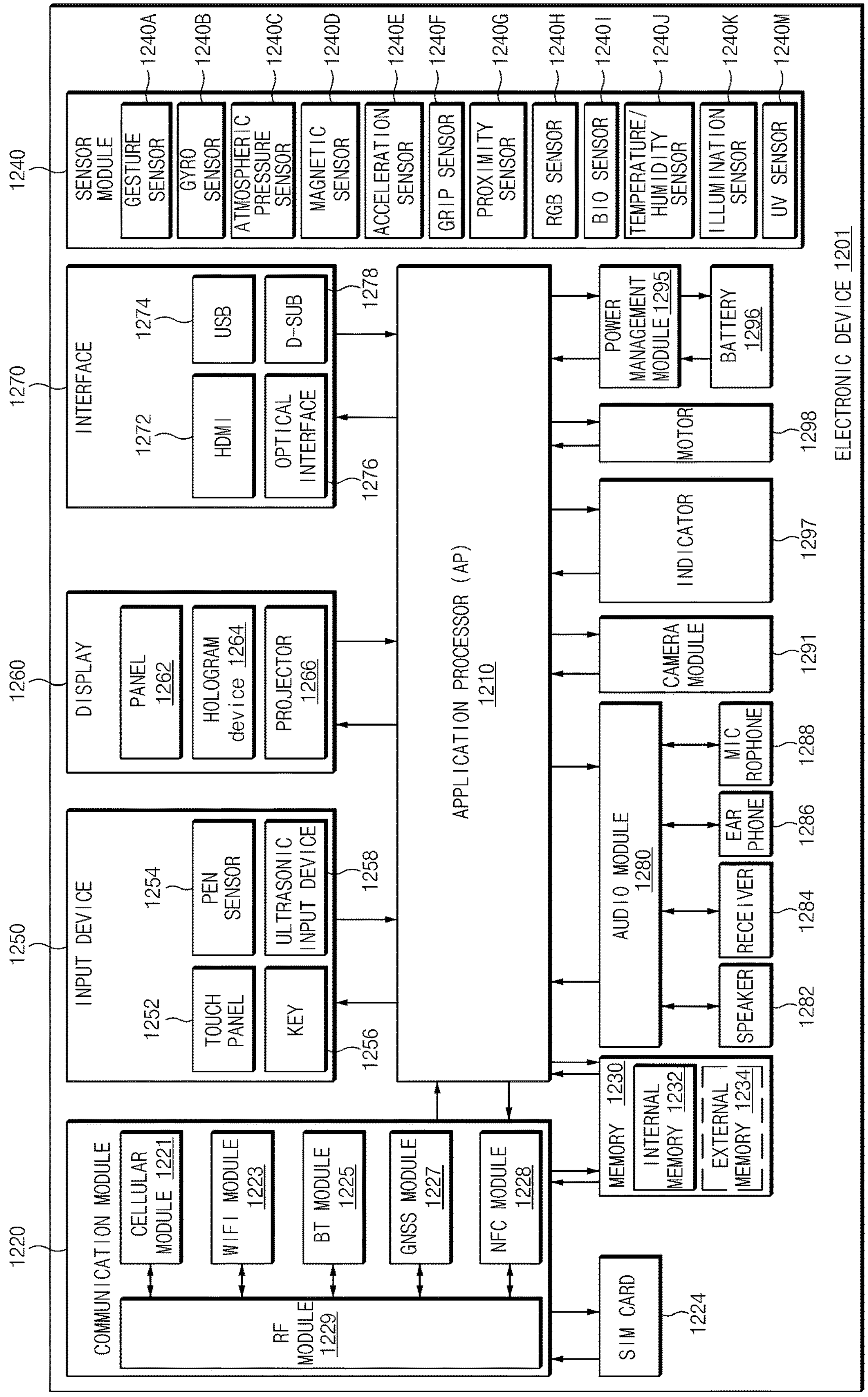
FIG. 12 is a diagram illustrating an electronic device according to an embodiment of the present disclosure.

FIG. 12 is a block diagram illustrating an electronic device according to an embodiment of the present disclosure.

Referring to FIG. 12, an electronic device 1201 may include at least one processor (e.g., AP) 1210, a communication module 1220, a subscriber identification module (SIM) 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may run an operating system or an application program so as to control a plurality of hardware or software elements connected to the processor 1210, and may process various data and perform operations. The processor 1210 may be implemented with, for example, a system on chip (SoC). According to an embodiment of the present disclosure, the processor 1210 may further include a graphic processing unit (GPU) and/or an image signal processor. The processor 1210 may include at least a portion (e.g., a cellular module 1221) of the elements illustrated in FIG. 12. The processor 1210 may load, on a volatile memory, an instruction or data received from at least one of other elements (e.g., a nonvolatile memory) to process the instruction or data, and may store various data in a nonvolatile memory.

The communication module 1220 may include, for example, a cellular module 1221 (e.g., the modem), a Wi-Fi module 1223, a Bluetooth module 1225, a GNSS module 1227 (e.g., a GPS module, a GLONASS module, a BeiDou module, or a Galileo module), an NFC module 1228, and a radio frequency (RF) module 1229.

The cellular module 1221 may provide, for example, a voice call service, a video call service, a text message service, or an Internet service through a communication network. The cellular module 1221 may identify and authenticate the electronic device 1201 in the communication network using the subscriber identification module 1224 (e.g., a SIM card). The cellular module 1221 may perform at least a part of functions that may be provided by the processor 1210. The cellular module 1221 may include a communication processor (CP).

Each of the Wi-Fi module 1223, the Bluetooth module 1225, the GNSS module 1227 and the NFC module 1228 may include, for example, a processor for processing data transmitted/received through the modules. According to some various embodiments of the present disclosure, at least a part (e.g., two or more) of the cellular module 1221, the Wi-Fi module 1223, the Bluetooth module 1225, the GNSS module 1227, and the NFC module 1228 may be included in a single integrated chip (IC) or IC package.

The RF module 1229 may transmit/receive, for example, communication signals (e.g., RF signals). The RF module 1229 may include, for example, a transceiver, a power amp module (PAM), a frequency filter, a low noise amplifier (LNA), an antenna, or the like. According to another embodiment of the present disclosure, at least one of the cellular module 1221, the Wi-Fi module 1223, the Bluetooth module 1225, the GNSS module 1227, or the NFC module 1228 may transmit/receive RF signals through a separate RF module.

The SIM 1224 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1230 may include, for example, an internal memory 1232 or an external memory 1234. The internal memory 1232 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1234 may include a flash drive such as a compact flash (CF), a secure digital (SD), a Micro-SD, a Mini-SD, an extreme digital (xD), a MultiMediaCard (MMC), a memory stick, or the like. The external memory 1234 may be operatively and/or physically connected to the electronic device 1201 through various interfaces.

The sensor module 1240 may, for example, measure physical quantity or detect an operation state of the electronic device 1201 so as to convert measured or detected information into an electrical signal. The sensor module 1240 may include, for example, at least one of a gesture sensor 1240A, a gyro sensor 1240B, a barometric pressure sensor 1240C, a magnetic sensor 1240D, an acceleration sensor 1240E, a grip sensor 1240F, a proximity sensor 1240G a color sensor 1240H (e.g., a red/green/blue (RGB) sensor), a biometric sensor 1240I, a temperature/humidity sensor 1240I, an illumination sensor 1240K, or an ultraviolet (UV) sensor 1240M. Additionally or alternatively, the sensor module 1240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1240 may further include a control circuit for controlling at least one sensor included therein. In some various embodiments of the present disclosure, the electronic device 1201 may further include a processor configured to control the sensor module 1240 as a part of the processor 1210 or separately, so that the sensor module 1240 is controlled while the processor 1210 is in a sleep state.

The input device 1250 may include, for example, a touch panel 1252, a (digital) pen sensor 1254, a key 1256, or an ultrasonic input device 12512. The touch panel 1252 may employ at least one of capacitive, resistive, infrared, and ultraviolet sensing methods. The touch panel 1252 may further include a control circuit. The touch panel 1252 may further include a tactile layer so as to provide a haptic feedback to a user.

The (digital) pen sensor 1254 may include, for example, a sheet for recognition which is a part of a touch panel or is separate. The key 1256 may include, for example, a physical button, an optical button, or a keypad. The ultrasonic input device 1258 may sense ultrasonic waves generated by an input tool through a microphone 1288 so as to identify data corresponding to the ultrasonic waves sensed.

The display 1260 may include a panel 1262, a hologram device 1264, or a projector 1266. The panel 1262 may have a configuration that is the same as or similar to that of the display 260 of FIG. 2. The panel 1262 may be, for example, flexible, transparent, or wearable. The panel 1262 and the touch panel 1252 may be integrated into a single module. The hologram device 1264 may display a stereoscopic image in a space using a light interference phenomenon. The projector 1266 may project light onto a screen so as to display an image. The screen may be disposed in the inside or the outside of the electronic device 1201. According to an embodiment of the present disclosure, the display 1260 may further include a control circuit for controlling the panel 1262, the hologram device 1264, or the projector 1266.

The interface 1270 may include, for example, an HDMI 1272, a USB 1274, an optical interface 1276, or a D-subminiature (D-sub) 1278. Additionally or alternatively, the interface 1270 may include, for example, a mobile highdefinition link (MHL) interface, an SD card/multi-media card (MMC) interface, or an infrared data association (IrDA) interface.

The audio module 1280 may convert, for example, a sound into an electrical signal or vice versa. The audio module 1280 may process sound information input or output through a speaker 1282, a receiver 1284, an earphone 1286, or the microphone 1288.

The camera module 1291 is, for example, a device for shooting a still image or a video. According to an embodiment of the present disclosure, the camera module 1291 may include at least one image sensor (e.g., a front sensor or a rear sensor), a lens, an image signal processor (ISP), or a flash (e.g., an LED or a xenon lamp).

The power management module 1295 may manage power of the electronic device 1201. According to an embodiment of the present disclosure, the power management module 1295 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, or the like. The motor 1298 may convert an electrical signal into a mechanical vibration, and may generate a vibration or haptic effect. Although not illustrated, a processing device (e.g., a GPU) for supporting a mobile TV may be included in the electronic device 1201. The processing device for supporting a mobile TV may process media data according to the standards of digital multimedia broadcasting (DMB), digital video broadcasting (DVB), mediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 13:
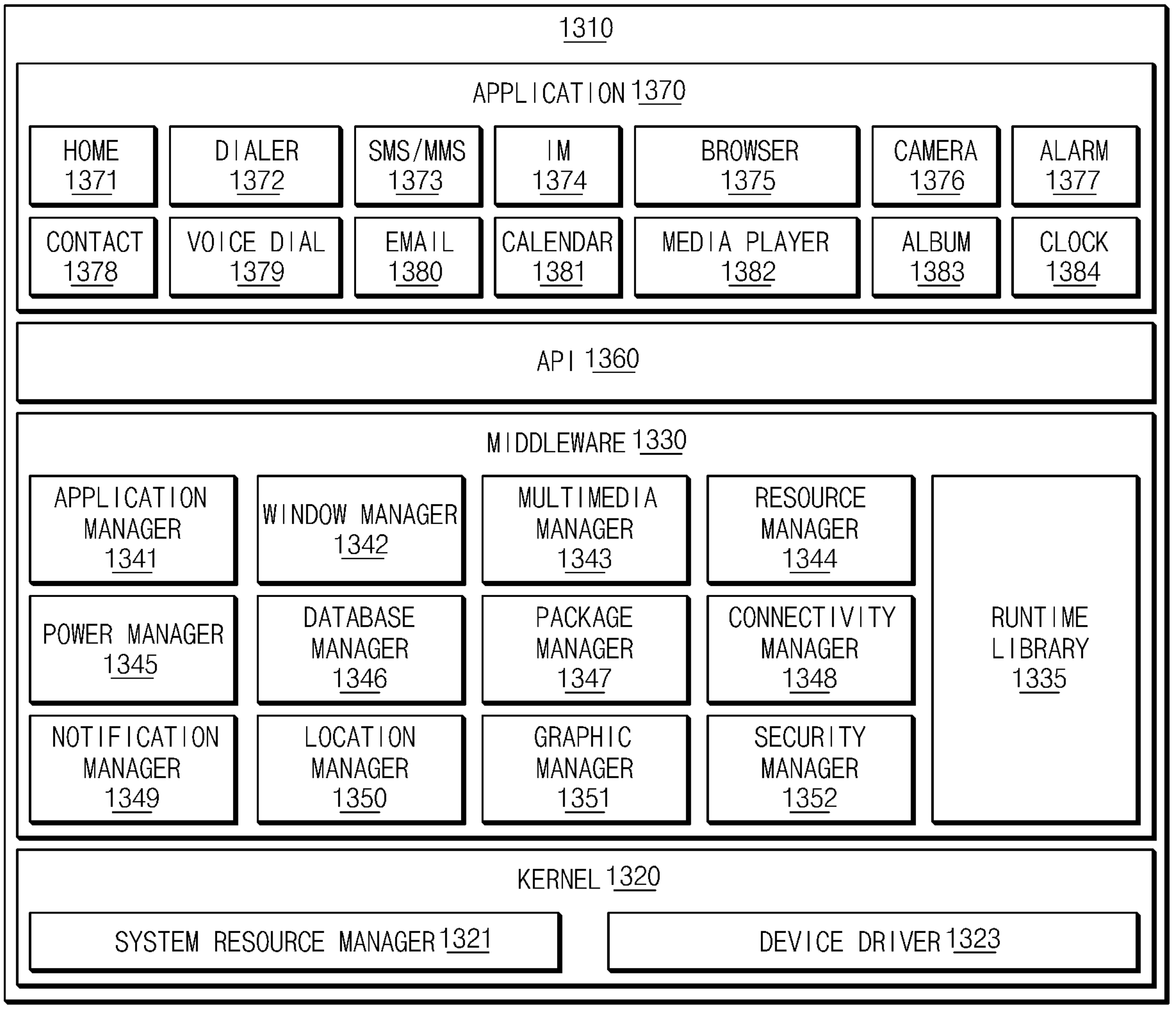
FIG. 13 is a diagram illustrating a program module according to an embodiment of the present disclosure.

FIG. 13 is a block diagram illustrating a program module according to an embodiment of the present disclosure.

Referring to FIG. 13, a program module 1310 may include an operating system (OS) for controlling a resource related to an electronic device (e.g., the electronic device and/or various applications running on the OS. The operating system may be, for example, Android, iOS, Windows, Symbian, Tizen, or the like.

The program module 1310 may include a kernel 1320, a middleware 1330, an API 1360, and/or an application 1370. At least a part of the program module 1310 may be preloaded on an electronic device or may be downloaded from an external electronic device.

The kernel 1320 may include, for example, a system resource manager 1321 or a device driver 1323. The system resource manager 1321 may perform control, allocation, or retrieval of a system resource. According to an embodiment of the present disclosure, the system resource manager 1321 may include a process management unit, a memory management unit, a file system management unit, or the like. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330, for example, may provide a function that the applications 1370 require in common, or may provide various functions to the applications 1370 through the API 1360 so that the applications 1370 may efficiently use limited system resources in the electronic device. According to an embodiment of the present disclosure, the middleware 1330 may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, and a security manager 1352.

The runtime library 1335 may include, for example, a library module that a complier uses to add a new function through a programming language while the application 1370 is running. The runtime library 1335 may perform a function for input/output management, memory management, or an arithmetic function.

The application manager 1341 may mange, for example, a life cycle of at least one of the applications 1370. The window manager 1342 may manage a GUI resource used in a screen. The multimedia manager 1343 may recognize a format required for playing various media files and may encode or decode a media file using a codec matched to the format. The resource manager 1344 may manage a resource such as a source code, a memory, or a storage space of at least one of the applications 1370.

The power manager 1345, for example, may operate together with a basic input/output system (BIOS) to manage a battery or power and may provide power information required for operating the electronic device. The database manager 1346 may generate, search, or modify a database to be used in at least one of the applications 1370. The package manager 1347 may manage installation or update of an application distributed in a package file format.

The connectivity manager 1348 may manage wireless connection of Wi-Fi, Bluetooth, or the like. The notification manager 1349 may display or notify an event such as message arrival, appointments, and proximity alerts in such a manner as not to disturb a user. The location manager 1350 may manage location information of the electronic device. The graphic manager 1351 may manage a graphic effect to be provided to a user or a user interface related thereto. The security manager 1352 may provide various security functions required for system security or user authentication. According to an embodiment of the present disclosure, in the case in which an electronic device includes a phone function, the middleware 1330 may further include a telephony manager for managing a voice or video call function of the electronic device.

The middleware 1330 may include a middleware module for forming a combination of various functions of the above-mentioned elements. The middleware 1330 may provide a module specialized for each type of an operating system to provide differentiated functions. Furthermore, the middleware 1330 may delete a part of existing elements or may add new elements dynamically.

The API 1360 is, for example, a set of API programming functions may be provided in different configurations according to an operating system. For example, in the case of Android or iOS, one API set may be provided for each platform, and, in the case of Tizen, at least two API sets may be provided for each platform.

The application 1370, for example, may include at least one application capable of performing functions such as a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, a clock 1384, health care (e.g., measure an exercise amount or blood sugar), or environmental information provision (e.g., provide air pressure, humidity, or temperature information).

According to an embodiment of the present disclosure, the application 1370 may include an information exchange application for supporting information exchange between electronic devices. The information exchange application may include, for example, a notification relay application for relaying specific information to the external electronic device or a device management application for managing the external electronic device.

For example, the notification relay application may have a function for relaying, to an external electronic device, notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device communicating with the electronic device, an application running in the external electronic device, or a service (e.g., a call service, a message service, or the like) provided from the external electronic device.

According to an embodiment of the present disclosure, the application 1370 may include a specified application (e.g., a healthcare application of a mobile medical device) according to an attribute of the external electronic device. The application 1370 may include an application received from an external electronic device. The application 1370 may include a preloaded application or a third-party application downloadable from a server. The names of the elements of the program module 1310 illustrated may vary with the type of an operating system.

According to various embodiments of the present disclosure, at least a part of the program module 1310 may be implemented with software, firmware, hardware, or a combination thereof. At least a part of the program module 1310, for example, may be implemented (e.g., executed) by a processor (e.g., the processor (810). At least a part of the program module 1310 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor, the processor may perform functions corresponding to the instructions. The computer-readable storage medium may be, for example, a memory.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C.

112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. An electronic device comprising a display driver configured to:

receive display data from an application processor;

compare, prior to storing, display data of at least some pixels among received display data, wherein the at least some pixels are arranged next to each other;

store the received display data in a GRAM of the display driver with comparison outcomes; and selectively amplify a display signal corresponding to at least one of the at least some pixels by an operation of a MUX based on the comparison outcomes;

wherein the display driver comprises a source driver and a gate driver, wherein the source driver comprises:

source pads connected to output stages of amplifiers associated with the at least some pixels;

switches disposed between each output stages and each source pads; and the MUX connected to the switches.

2. The electronic device of claim 1, wherein the display driver is further configured to display the amplified display signal in a display region corresponding to the at least one of the at least some pixels when the display data in the at least one of the at least some pixels is not substantially same as the display data in other ones of the at least some pixels.

3. The electronic device of claim 2, wherein the display driver is further configured to display the amplified display signal in the display region corresponding to the at least one of the at least some pixels and a display region corresponding to the other ones of the at least some pixels when display data in the at least one of the at least some pixels is substantially same as display data in the other ones of the at least some pixels.

4. The electronic device of claim 1, wherein the display driver is further configured to, when the display data in the at least one of the at least some pixels is substantially same as the display data in other ones of the at least some pixels, disable a first amplifier associated with the at least one of the at least some pixels.

5. The electronic device of claim 4, wherein the display driver is further configured to, when the display data in the at least one of the at least some pixels is substantially same as the display data in the other ones of the at least some pixels, enable a second amplifier associated with the other ones of the at least some pixels while the first amplifier is disabled.

6. The electronic device of claim 5, wherein the display driver is further configured to supply an output from the second amplifier to an output stage of the first amplifier.

7. The electronic device of claim 1, further comprising a data shift register or a memory for the display data.

8. The electronic device of claim 1, wherein the display driver is further configured to output comparison value information associated with the at least some pixels, the comparison value information representing the comparison outcome.

9. The electronic device of claim 1, further comprising:

a channel selection switch disposed between the output stage of an amplifier associated with the at least one of the at least some pixels and the source pad associated with other ones of the at least some pixels.

10. A method for operating an electronic device including a display driver, wherein the display driver comprises a source driver and a gate driver, wherein the source driver comprises source pads connected to output stages of amplifiers associated with at least some pixels, switches disposed between each output stages and each source pads and a MUX connected to the switches, the method comprising:

receiving display data from an application processor;

comparing, prior to storing, display data of the at least some pixels among received display data, wherein the at least some pixels are arranged next to each other;

storing the received display data in a GRAM of the display driver with comparison outcomes; and selectively amplifying a display signal corresponding to at least one of the at least some pixels by an operation of the MUX based on the comparison outcomes.

11. The method of claim 10, further comprises: displaying the amplified display signal in a display region corresponding to the at least one of the at least some pixels when the display data in the at least one of the at least some pixels is not substantially same as the display data in other ones of the at least some pixels.

12. The method of claim 11, further comprises: displaying the amplified display signal in the display region corresponding to the at least one of the at least some pixels and a display region corresponding to the other ones of the at least some pixels when display data in the at least one of the at least some pixels is substantially same as display data in the other ones of the at least some pixels.

13. The method of claim 10, further comprises, when the display data in the at least one of the at least some pixels is substantially same as the display data in other ones of the at least some pixels, disabling a first amplifier associated with the at least one of the at least some pixels.

14. The method of claim 13, further comprises, when the display data in the at least one of the at least some pixels is substantially same as the display data in the other ones of the at least some pixels, enabling a second amplifier associated with the other ones of the at least some pixels while the first amplifier is disabled.

* * * * *